United States Patent
Hamamatsu et al.

(10) Patent No.: US 8,510,274 B2
(45) Date of Patent: Aug. 13, 2013

(54) METHOD FOR VERIFYING CONVERSION, APPARATUS AND PROGRAM OF THE SAME

(75) Inventors: Tsuyoshi Hamamatsu, Tokyo (JP); Mitsuaki Hirayama, Tokyo (JP)

(73) Assignee: Inforce Co., Ltd., Tokyo (JP)

( * ) Notice: Subject to any disclaimer, the term of this patent is extended or adjusted under 35 U.S.C. 154(b) by 0 days.

(21) Appl. No.: 13/324,278

(22) Filed: Dec. 13, 2011

(65) Prior Publication Data

US 2013/0151479 A1    Jun. 13, 2013

(51) Int. Cl.
*G06F 17/00* (2006.01)

(52) U.S. Cl.
USPC ............. 707/690; 707/774; 707/809

(58) Field of Classification Search
USPC .......................... 707/690, 809, 774
See application file for complete search history.

(56) References Cited

U.S. PATENT DOCUMENTS 7,885,968 B1    2/2011  Hamamatsu et al.
2005/0240565 A1*  10/2005  Kapitanski et al. ........... 707/1

FOREIGN PATENT DOCUMENTS

| JP | 2002-351710 A | 12/2002 |
| JP | 2009-223851 A | 10/2009 |
| JP | 4522485 B1 | 6/2010 |

* cited by examiner

*Primary Examiner* — Robert Beausoliel, Jr.
*Assistant Examiner* — Nirav K Khakhar
(74) *Attorney, Agent, or Firm* — Cermak Nakajima LLP; Tomoko Nakajima

(57) ABSTRACT

Apparatus for verifying conversion 117 inserts a cord extracting an SQL sentence in a program to handle with Access database system 111 and extracts an SQL sentence at the time of practice automatically. And it is converted into an SQL sentence handled with SQL-SERVER database system 113. And an SQL sentence is carried out with Access database system 111 and SQL-SERVER database system 113, and the result is compared, and the SQL sentence that is mismatched for a result is identified.

9 Claims, 18 Drawing Sheets

FIG. 4

| FIELD NAME | DATA TYPE |
|---|---|
| ID | IDENTIFICATION |
| txt_DataBaseName | DATABASE NAME |
| txt_ObjectName | OBJECT NAME |
| str_SQLString | SQL SENTENCE BEFORE CONVERSION |
| aft_str_SQLString | SQL SENTENCE AFTER CONVERSION |
| FLAG | FLAG DATA |

SQL SENTENCE ACQUISITION TABLE DATA SQT

| |
|---|
| .Open_ |
| .Open( |
| .OpenRecordset |
| .Execute |
| .RowSource = |
| .RecordSource = |
| DoCmd.RunSQL |

FIG. 5A

| |
|---|
| "SELECT |
| "UPDATE |
| "DELETE |
| "INSERT |
| "CREATE |
| "DROP |

| OBJECT NAME | ROW POSITION | MDB SQL STRING | NUM BER | NUMBER OF ITEM | FIRST | LAST | MIDDLE |
|---|---|---|---|---|---|---|---|
| DATE AND TIME OF COMPARISON | RESULT | ADP SQL STRING | NUM BER | NUMBER OF ITEM | FIRST | LAST | MIDDLE |
| RECORD SET LAPPER | 38 | SELECT*FROM[ORDER] WHERE 1=1 | 38 | 16 | ... | ... | |
| 2010/05/1 8 11:11:58 | NG | SELECT [ORDER]* | 28 | 16 | ... | ... | |

RESULT OF EXECUTION TABLE

FIG. 7

| ACTION QUERY | REARRANG EMENT | PARAMETER | FORM REFERENCE | OUTPUT TYPE (CHILD) | | | | | OUTPUT TYPE AFTER CONVERSION |
|---|---|---|---|---|---|---|---|---|---|
| | | | | NO CHILD | VIEW | FUNCTION | ST | DUMMY | |
| ○ | - | - | - | | | | | | ST |
| × | × | × | - | ○ | - | - | - | - | VIEW |
| × | × | × | - | - | ○ | - | - | - | VIEW |
| × | × | × | - | - | - | × | × | × | DUMMY |
| × | × | × | × | - | - | ○ | ○ | × | DUMMY |
| × | × | × | × | - | - | - | - | ○ | DUMMY |
| × | × | ○ | ○ | ○ | - | - | - | - | FUNCTION |
| × | × | ○ | ○ | - | - | × | × | × | FUNCTION |
| × | × | ○ | ○ | - | - | ○ | ○ | × | DUMMY |
| × | × | ○ | ○ | - | - | - | - | ○ | DUMMY |
| × | × | ○ | ○ | ○ | - | - | - | - | ST |
| × | × | ○ | ○ | - | ○ | - | - | - | ST |
| × | × | ○ | ○ | - | △ | × | × | × | DUMMY |
| × | × | ○ | ○ | - | - | ○ | ○ | × | DUMMY |
| × | × | ○ | ○ | - | - | - | - | ○ | DUMMY |
| × | | | | ○ | - | - | - | - | ST |
| × | | | | - | ○ | - | - | - | ST |
| × | | | | - | - | × | × | × | DUMMY |
| × | | | | - | - | ○ | ○ | × | DUMMY |
| × | | | | - | - | - | - | ○ | DUMMY |
| OTHERS | | | | | | | | | |

ST: STORED-PROCEDURE

METHOD FOR VERIFYING CONVERSION, APPARATUS AND PROGRAM OF THE SAME

FIELD OF INVENTION

The present invention is related to method for verifying conversion, an apparatus and program of the same for processing relating to a conversion of database.

BACKGROUND

According to change of enterprise scale etc., a predetermined database system may be converted to the other database systems. As technology for conversion of the database system, there is technology described in Japanese Unexamined Patent Application Publication No. 2002-351710, for example.

The SQL sentences which can be used for a database system differs for every system as described in the Japanese Unexamined Patent Application. Then, in the system of the Japanese Unexamined Patent Application, smooth conversion of a database system is achieved by cooperating GUI technology and SQL sentence automatic conversion process.

Although the target for conversion in the Japanese Unexamined Patent is the SQL sentence itself, the format of SQL sentences are diverse, therefore cannot be analyzed all of its syntax nor converted. Under this circumstance, the applicant provides a program which converts (upsize) "Access" (trademark) of Microsoft Corp. into SQL server database. By the way, in developing such programs, if it is possible to extract SQL sentences which could not be converted properly, it will be useful for next development.

However, in the past, SQL sentences cannot be converted properly are unable to extract

SUMMARY OF THE INVENTION

Therefore, this invention aims to provide the data processing method, the apparatus and its programs that allow extracting the SQL sentences could not converted properly when database is converted.

A first invention is a method for verifying conversion when converting management operation data which in which a query command for a first database described in a first program processed with the first database into a management operation data which described a query of the same function in the second program processed with the second database, comprising: a first step for inserting an acquisition operation code acquiring the first management operation data operating for the table data in the first program into the first program; a second step for acquiring the result which is obtained by converting the first management operation data obtained by the acquisition operation code in the process of executing the first program into the second management operation data of the second database; a third step for carrying out the first management operation data with the first data system and carrying out the second management operation data with the second database system; and a fourth step for comparing the data acquired depending on the processing of the third management operation data in the third step and the data acquired depending on the processing of the second management operation data.

Second invention is an apparatus for verifying conversion when converting management operation data which in which a query command for a first database described in a first program processed with the first database into a management operation data which described a query of the same function in the second program processed with the second database, comprising: an inserter inserting an acquisition operation code acquiring the first management operation data operating for the table data in the first program into the first program; an acquirer acquiring the result which is obtained by converting the first management operation data obtained by the acquisition operation code in the process of executing the first program into the second management operation data of the second database; a computer carrying out the first management operation data with the first data system and carrying out the second management operation data with the second database system; and a comparator comparing the data acquired depending on the processing of the third management operation data in the third step and the data acquired depending on the processing of the second management operation data.

Third invention is a computer program for verifying conversion when converting management operation data which in which a query command for a first database described in a first program processed with the first database into a management operation data which described a query of the same function in the second program processed with the second database, the computer program having computer instructions on a computer readable medium, the instructions being adapted to enable a computer system to perform operation, comprising: a first step for inserting an acquisition operation code acquiring the first management operation data operating for the table data in the first program into the first program; a second step for acquiring the result which is obtained by converting the first management operation data obtained by the acquisition operation code in the process of executing the first program into the second management operation data of the second database; a third step for carrying out the first management operation data with the first data system and carrying out the second management operation data with the second database system; and a fourth step for comparing the data acquired depending on the processing of the third management operation data in the third step and the data acquired depending on the processing of the second management operation data.

BRIEF DESCRIPTION OF THE DRAWINGS

FIG. 4 is an example of a SQL sentence acquisition table data used in the present embodiment.

FIG. 5A and FIG. 5B is a view for explaining the method for inserting a sentence for calling function of SQL string acquisition.

FIG. 6 is a view for explaining an execution result table.

FIG. 7 is a view for explaining conversion pattern of a conversion apparatus.

THE PREFERRED EMBODIMENT OF THIS INVENTION

Hereafter, the data system relating to the embodiment of the present invention will be explained.

Figure 1:
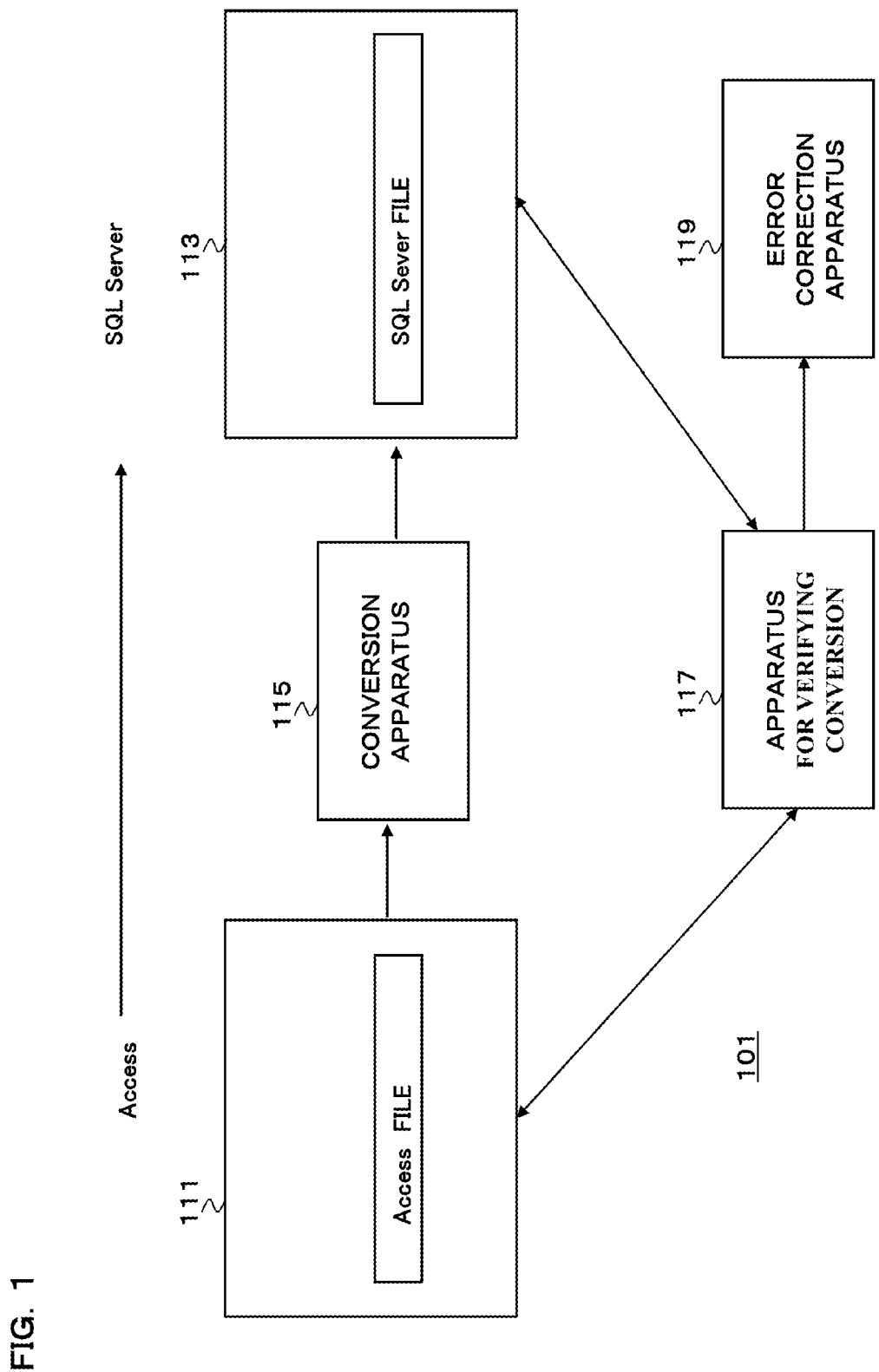
FIG. 1 is a block diagram of data system relating to the embodiment of the present invention.

FIG. 1 is a block diagram of data system 101 relating to the embodiment of the present invention.

As FIG. 1 shows, in data system 101, Access database system 111 as source of migration is Access of Microsoft Corp., and SQL-SERVER database system 113 as destination of migration is likewise SQL Server of Microsoft Corp.

A conversion apparatus 115 converts Access program in Access database system 111 to SQL-SERVER programs to be able to process by SQL-SERVER database system 113.

An apparatus for verifying conversion 117 verify whether the above conversion is done correctly by the conversion apparatus 115.

Note that, the database system to be converted and the database system after conversion are not limited to these.

By the way, in a relational database system, the command of search of data, updating, deletion, etc., is issued to the system by using a query of a character string. In a search query, the extraction conditions of the target table or data, how to arrange, etc. are specified. The query generated once is saved and can be used repeatedly.

A relational database uses language called SQL for description of a query in the system.

In a general-purpose relational database such as "Access" of Microsoft Corp. (an example of the first database system of the present invention), the type of the query is defined so that beginners can also program rather than performance or scalability.

On the other hand, in more advanced databases (an example of the second database system of the present invention), such as SQL Server, two or more types of queries are prepared and restrictions of the description method etc. are prepared about each query. This is for raising the performance and scalability of application based on the database.

In the embodiment, as shown in FIG. 1, the apparatus for verifying conversion 117 is used in system converts Microsoft Access Program (sentence SQL) to SQL Server to be able to process.

Hereafter, the apparatus for verifying conversion 117 relating to the embodiment of the present invention will be explained.

Figure 2:
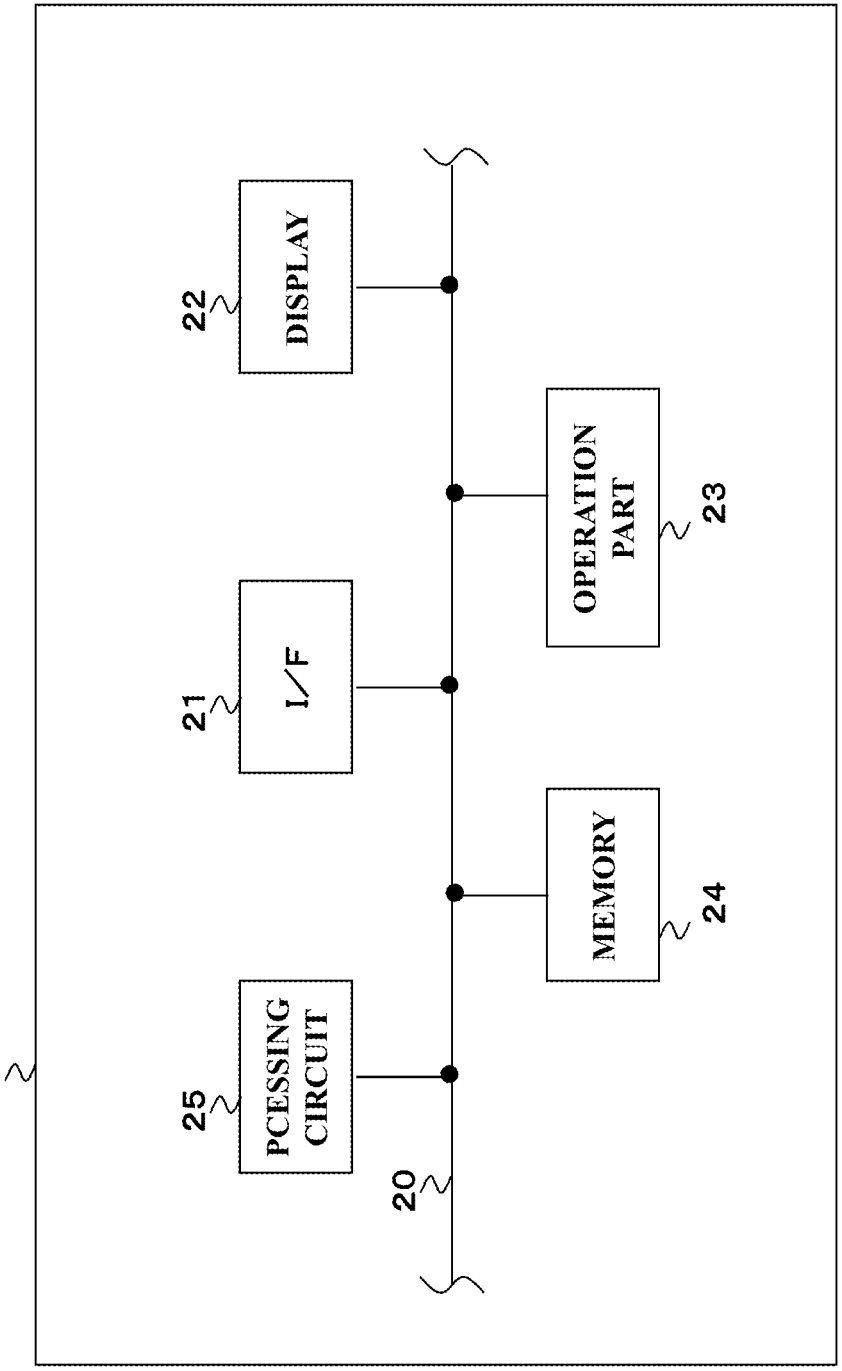
FIG. 2 is a block diagram of an apparatus for verifying conversion relating to the embodiment of the present invention.

FIG. 2 is a block diagram of the apparatus for verifying conversion 117 relating to the embodiment of the present invention.

As shown in FIG. 2, the apparatus for verifying conversion 117, for instance, an interface 21, a display 22, an operation part 23, a memory 24 and a processing circuit 25. These components are connected via bus 20.

The interface 21 is used to communicate with other computers for instance.

The display 22 displays various screens provided by program RPG executed by the processing circuit 25.

The operation part 23 is means of keyboard and mouse operation.

The memory 24 temporarily stores the program PRG performed by processing circuit 25 and used to process the data processing circuit 25.

The processing circuit 25 executes the program PRG, and control Apparatus for verifying conversion 117's process comprehensively.

The processing circuit 25 sequentially writes data from processes in memory 24 from each process described in the flowchart of this embodiment and read it.

Process of the apparatus for verifying conversion 117 shown in this embodiment has been described in the program PRG.

Figure 3:
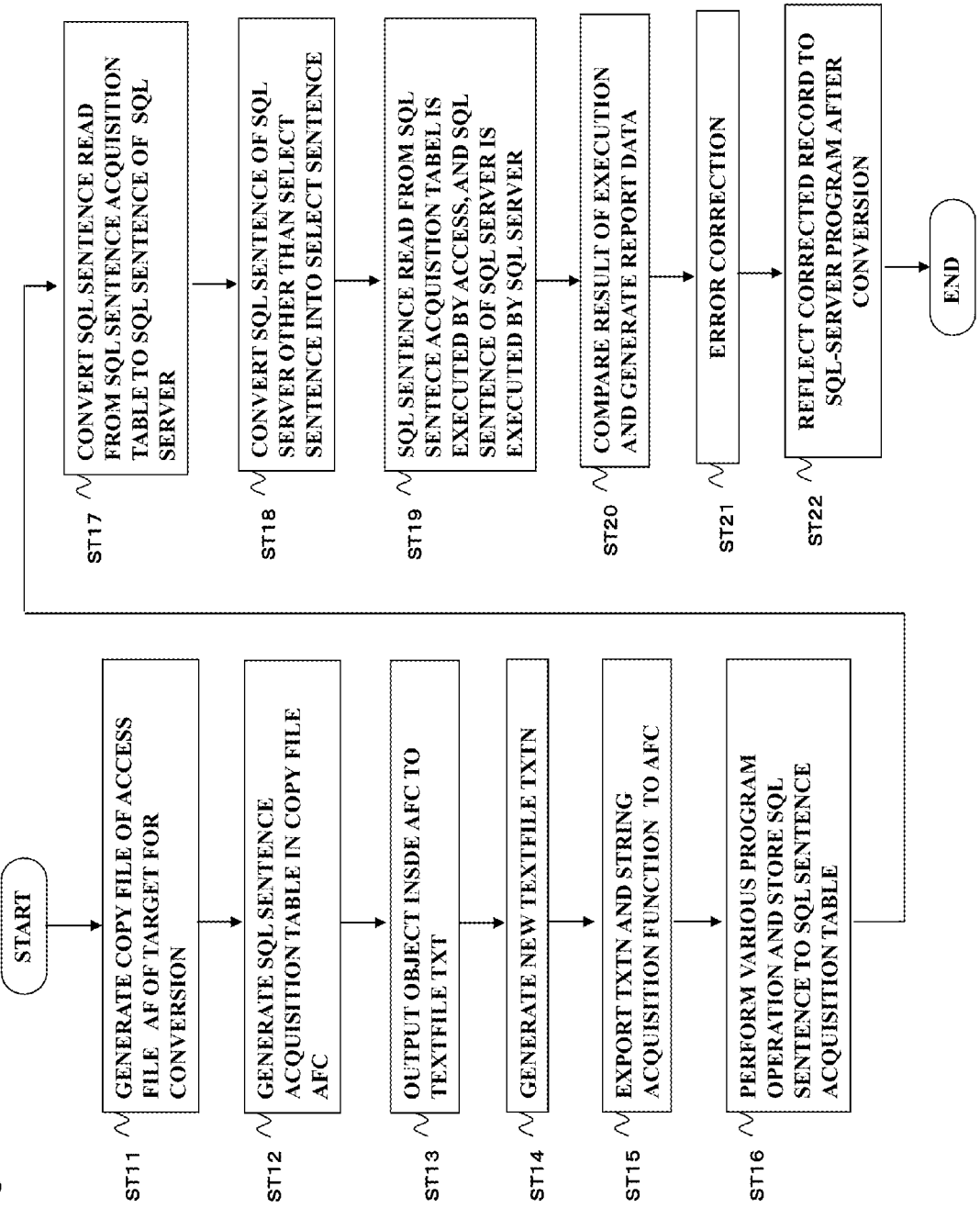
FIG. 3 is a flowchart of explaining the process of apparatus for verifying conversion shown in FIG. 1 and FIG. 2.

FIG. 3 is a flowchart of explaining the process of the apparatus for verifying conversion 117 shown in FIG. 1 and FIG. 2.

Step ST11:

The processing circuit 25 in the apparatus for verifying conversion 117 creates a copy of the program PRG-A from program CPRG-A processed in the Access database system 111 and write in the memory 24.

Step ST12:

The processing circuit 25 creates SQL sentence acquisition table data SQT shown in FIG. 4 in a program CPRG-A memorized in the memory 24.

Step ST13:

Processing circuit 25 output text file data from object data in program CPRG-A.

Object data in this context means the data describes functions such as forms, reports, and module.

Step ST14:

The processing circuit 25 creates a new text file TXTN which add SQL sentence above text to TXT file data.

Concretely, the processing circuit 25 opens the text file data TXT and creates a new text file copied the code in a text file data TXT related.

Then, the processing circuit 25 reads codes (strings) in a new text file TXTN sequentially from the start, for example, determines whether there is strings shown in FIG. 5A indicate SQL statements' execute commands and strings shown in FIG. 5B.

Afterward the Processing circuit 25 adds sentence for calling function of SQL string acquisition one row above the strings shown in FIG. 5A in a new text file TXT when determine strings shown in FIGS. 5 A and B are exist.

Step ST15:

The processing circuit 25 outputs a new text file TXTN for program CPRG-A. Thus, a new text file TXTN is stored in the program CPRG-A. Concretely, object data corresponding to the text file TXT is replaced in object data recorded in the new text file TXTN.

In addition, the processing circuit 25 exports (resister) function of SQL string acquisition to Program CPRG-A. Function of SQL string acquisition will be available in program CPRG-A.

Step ST16:

The processing circuit 25 performs various program operations (actions) in program CPRG-A.

Herewith, Sentence for calling function of SQL string acquisition in new text file TXTN in program CPRG-A is executed, and SQL statements exist immediately following are extracted and stored in SQL statement acquisition table data and Execution result table data.

Step ST17:

The processing circuit 25 outputs an Access's SQL sentence extracted in step ST16 to the apparatus for verifying conversion 117 and converts to SQL sentences able to process in SQL-SERVER data system 113

Then, the processing circuit 25 stores converted SQL sentences in SQL statement acquisition table data and Execution result table data.

Step ST18:

The processing circuit 25 converts SQL statement in Access database system 111 extracted in step ST16 and SQL statement except SELECT statement in SQL statement which able to process in SQL-SERVER database converted step ST17 to SETECT statement.

For such conversion will be described in detail later with reference from FIG. 7 to 18.

Step ST19:

The processing circuit 25 outputs SQL sentences in Access database system 111 converted in Step ST18 to Access database system 11 and executes it.

The processing circuit 25 enters results of execution from Access database system 11 and stores in "MDB SQL strings" in results of execution table shown in FIG. 6.

In addition, the processing circuit outputs SQL statements in SQL-SERVER data system 113 converted in STEP ST18 to SQL-SERVER database system and execute it.

The processing circuit 25 enters result of execution from SQL-SERVER data system 113 and stores in "ADP SQL strings" in results of execution table shown in FIG. 6.

The processing circuit 25, in the result table shown in FIG. 6, compares the result of executing "MDB SQL strings" and the result of executing "ADP SQL strings" the corresponding result for each attribute.

The processing circuit 25, in such comparisons, compares specified check-items such as record count, number of fields, the first records of data value, the middle record of data value and the final record of data value.

The processing circuit 25 sets "1" (flag) SQL statements in SQL statements acquisition table data SQT corresponding to the record's flag data FLAG when any discrepancy mentioned above occurred.

In addition, the processing circuit 25 creates report data about mismatch SQL statements indicates name of Access program PRG-A, module line position, SQL statements in Access, SQL Statements in SQL SERVER and bug.

Examples of defect contents are; mismatches of record count, number of fields, the first records of data value, the middle record of data value, the final record of data value. And SQL-SERVER database system 133's error content etc.

The processing circuit 25 sends the report data generated in step ST20 to error correction device 19 shown in FIG. 1.

The error correction apparatus 19 modify the SQL sentence in SQL SERVER based on report data.

The error correction unit 19 sends modified SQL sentence in step ST21 to SQL-SERVER database system 113 for example and reflect the program that can be handled by SQL Server.

Hereinafter process of the Step ST18 will be described in detail.

[SELECT . . . INTO]
Before Conversion:
SELECT Table__1.Filed__1, Table__1.Filed__2, Table__1.Filed__3, Table__1.Filed__4, Table__1.Filed__5, Table__1.Filed__6 INTO Table__3_Temp
FROM Table__1;
After Conversion:
SELECT Table__1.Filed__1, Table__1.Filed__2, Table__1.Filed__3, Table__1.Filed__4, Table__1.Filed__5, Table__1.Filed__6
FROM Table__1;

[UPDATE]
Before Conversion:
UPDATE Table__1 INNER JOIN Table__2 ON Table__1.Filed__1=Table__2.Filed__1 SET Table__1.Filed__1="OK"
WHERE (((Table__1.Filed__2)="ABC"));
After Conversion:
SELECT Table__1 INNER JOIN Table__2 ON Table__1.Filed__1=Table__2.Filed__1

[DELETE]
Before Conversion:
DELETE Table__2.*
FROM Table__2;
After Conversion:
SELECT Table__2.*
FROM Table__2;

[INSERT INTO]
Before Conversion:
INSERT INTO Table__2 (Filed__1, Filed__2, Filed__3, Filed__4, Filed__5, Filed__6)
SELECT Table__1.Filed__1 AS EEE, Table__1.Filed__2, Table__1.Filed__3, Table__1.Filed__4, Table__1.Filed__5, Table__1.Filed__6
FROM Table__1;
After Conversion:
SELECT Table__1.Filed__1 AS EEE, Table__1.Filed__2, Table__1.Filed__3, Table__1.Filed__4, Table__1.Filed__5, Table__1.Filed__6
FROM Table_1;

As described above, the apparatus for verifying conversion 117 is able to extract SQL sentences processed in Access database system and could not converted properly in the conversion apparatus 155 automatically.

Therefore, the information about SQL sentences could not be converted properly is retrieved, and it will help to improve conversion apparatus 155's conversion algorithm.

In addition, the data system 101 is able perform error correction process by outputting the SQL sentence could not be converted properly in the conversion apparatus 115 into the error correction apparatus 119.

Furthermore, the apparatus for verifying conversion 117, as shown in step ST18 in FIG. 3, is able to obtain relevant data pertaining to the operation and perform comparison processing by convert non-SELECT sentences to SELECT sentences, even if data acquisition operation on table data is not performed.

Hereafter, the apparatus for verifying conversion 117 relating to the embodiment of the present invention will be explained.

The example where the relational database system to be converted is "ACCESS" of Microsoft Corp. and the relational database system after conversion is SQL server of Microsoft Corp. will be explained.

Note that, the database system to be converted and the database system after conversion are not limited to these.

By the way, in a relational database system, the command of search of data, updating, deletion, etc., is issued to the system by using a query of a character string. In a search query, the extraction conditions of the target table or data, how to arrange, etc. are specified. The query generated once is saved and can be used repeatedly. A relational database uses language called SQL for description of a query in the system.

In a general-purpose relational database such as "Access" of Microsoft Corp. (an example of the first database system of the present invention), the type of the query is defined so that beginners can also program rather than performance or scalability.

On the other hand, in more advanced databases (an example of the second database system of the present invention), such as SQL Server, two or more types of queries are prepared and restrictions of the description method etc. are prepared about each query. This is for raising the performance and scalability of application based on the database.

For example, existence of the rearrangement sentence (ORDER BY) of items, existence of a parameter, existence of an addition, deletion, and an update process, and existence of the nest from other queries is used as conditions for constrain. Three query types are defined by combining the conditions for constrain as shown in the following table 1.

Two or more of these queries are classified into three types of a "view", a "table function", and a "stored-procedure."

[Table 1]

The database conversion system of the present embodiment converts each of the query of "Access" (it is hereafter described also as an original query) into the query of SQL Server ((it is hereafter described also as a converted query) of suitable type based on the contents of the original query.

"The nest from other queries" indicates that the query is a child of other queries.

"Addition, deletion and updating processing" are functions required at the time of the call from form.

"Form" is used for starting input box on a screen. It needs the functions, such as addition, deletion and updating processing.

In Table 1 mentioned above, the reason for technical of the part which is shown as prohibition (No) will be explained below.

The reason that the view does not include an "ORDER BY" phrase.

The SQL grammar permits including "ORDER BY" phrase. However, when performing the view, database engine optimizes to perform by the execution plan in which performance is important, and does not return the rearranged result. The rearrangement processing may scan all the data and this may generally return a result in the right order. So that the load of processing is high. Since priority is given to performance to the view used on various aspects of affairs, it is defined in this way. On the other hand, the stored-procedure is not optimized to fall performance, but it is possible to return the rearranged result as it is.

[The Reason the View Does Not Include a Parameter]

Narrowing down by the parameter specification which needs all the line scans is prohibited from a viewpoint of performance like the reason of the "ORDER BY" phrase.

[The Reason that the Function Cannot Add, Update and Delete]

The result returned from the view and the stored-procedure is returned to the value of the table of an original database (memory) in the state which can be referred to directly. That is, change of the returned result in changes of the value of actual data.

On the other hand, in case the function is performed, database engine generates the table internally temporarily. This is for avoiding the record locking of the original table and not doing an obstacle to other operations. A result is inserted in a temporal table and the temporal table is returned as a result. For this reason, the returned result cannot perform direct reference to the value of a table. Moreover, since the temporal table is passed as mentioned above, generation and deletion of the temporal table are repeated at the time of execution, and performance is always low.

[The Reason the Stored-Procedure Prohibits the Nest from Other Queries]

The stored-procedure is used in order to make two or more SQL sentences into batch processing with a name and to enable reuse of them. It is also possible to return two or more results depending on the contents of the stored-procedure, and it is also possible not to return a value.

Since the data type use as return is not a table data type, usage for acquiring a result in the SQL (used as a table in the "FROM" phrase) is not permitted on grammar. That is, what can be used as a table within a FROM phrase in SQL is a return value of the view and the function which returns a table type value.

Hereafter, three types of the query specified by SQL SERVER (database system after conversion) will be explained.

[View]

Performance of the view is higher than the function and the stored-procedure.

The view searches and takes out the item specified with the "SELECT" phrase from the table which is specified with the "FROM" phrase. Moreover, the view can specify a search condition with the "WHERE" phrase.

[Function]

In the present embodiment, functions are table functions, such as an in-line table value function or two or more statement table value function.

The function has the following characteristics besides restrictions of the above-mentioned table 1, for example.

The function dose not include an action query.

The function has certainly a table type return value.

Here, an action query means the query which performs a certain action of deletion, updating, or an addition to a table record. Specifically, the query includes a DELETE sentence, a UPDATE sentence, an INSERT sentence, or a SELECT INTO sentence.

Since queries, such as ACCESS, always comprised a single SQL sentences, they are equipped with the function necessary for an in-line table value function.

The reason for defining the number of the SQL sentence of the in-line table value function single is that reference origin of data, extraction conditions, the item name and data type of a table value which are returned as a result can be determined from a single SQL sentence.

The two or more statement table value functions are table value functions which defines a variable inside and can perform control statements (IF ELSE etc.). Unlike the in-line table value function, it have to declare clearly the item name and data type of the part which can perform complicated control, and the table value returned as a result.

These table value functions become a powerful tool which replaces the view. A table value function can be used at the place which can specify the table type or view type in a query. The two or more statement table value functions can include an additional statement which can use higher logic than logic used in the view.

The table value function can also be used instead of the stored-procedure as for which a single result returns a set. Although the table returned with a table value function can be referred to from the "FROM" phrase of an SQL statement, since it is not a table type, the value returned from the stored-procedure cannot be referred to.

Note that, the function may make a query and the query may be referred to in form. Therefore, when it has the child query of the function, it is judged that there is possibility of data manipulation.

[Stored-Procedure Type]

The stored-procedure has the following characteristics besides restrictions of the above-mentioned table 1, for example.

The degree of performance is middle.

It may include an action query. An action query can have only stored-procedure type.

Although the existence of the return value is arbitrary, the return value is only a value type and is not a table type.

Memory Cache is permitted.

The SQL Server (database) includes individual data and secret data. When permission is given to users at any time, the security and confidentiality of this information may sometimes be threatened.

Therefore, the stored-procedure which has structure permitting change of only few portions is used.

The stored-procedure is the function of the standard foundation for SQL. Only database administrator can determine the query which is executed by the database in advance. This is similar with the function in a typical programming language. This query prior determination can provide with security and performance predictability. Many users of the relational database depend on the stored-procedure to make arbitrary queries not to be consumed by the database.

In the case of the stored-procedure, "CREATE PROCEDURE [stored-procedure name]" is used, for example. Keywords called "PROCEDURE" are directions of stored-procedure generation. The SQL sentence to define is described after "AS" phrase. The stored-procedure generated in the "CREATE" sentence is stored on a database server like the view. The stored-procedure defined once can also be called from other users, if authority is set up.

The SQL sentence defined as "AS" phrase can use almost all SQL sentences including "SELECT" statement. Moreover, specification of not only one SQL sentence but two or more SQL sentences is possible. Although execution of an SQL sentence is fundamentally carried out in order of the defined turn, it is possible to control the order of execution like other languages, or to also make it repeat.

In the simple function "calling the "SELECT" statement which named and saved the name on the database", the stored-procedure is the same as the view. The stored-procedure demonstrates its ability at the time of execution by "SQL SERVER". The main purposes which save the program in the database are as follows.

Prevent inconsistency of data by communalizing and mounting processing to the database used repeatedly.

By performing the inquiry by the complicated conditions which cannot be processed in an independent "SELECT" statement not on a client program but on a database, the amount of communications between the client and the database is reduced, and response time is shortened.

If a series of processing are collectively generated by the stored-procedure, the inquiry in a database just needs to call the stored-procedure once. In the system which processes the order from a lot of customers, it becomes possible to reduce the amount of communications between the client and the database sharply.

That is, SQL Server (database system) carries out processing of the stored-procedure by executing codes for addition, change, and deletion of the value of the table of an original database. When a final result comes out, it is returned to the client from SQL Server.

On the other hand, if it tries to perform the same processing by function, the addition, the updating and the deletion of a table cannot be performed during execution.

As mentioned above, a general-purpose related database, such as "ACCESS", dose not define type of query so that beginners can also program rather than performance or scalability.

On the other hand, in more advanced databases, such as "SQL SERVER", in order to raise the performance and scalability of application based on a database, the two or more type of queries are prepared, and the restrictions of the description method etc. are prepared about each query.

Therefore, when converting "Access" query to "SQL Server" query, you have to determine the type of a suitable "SQL Server" query, considering various conditions.

The data conversion apparatus of the present embodiment converts the SQL statement for "ACCESS" used in "ACCESS" to suitable SQL for SQL Server based on the conversion pattern shown in FIG. 2 using the constraints of Table 1 mentioned above. Consequently the data conversion apparatus generates query which may be used in SQL Server by using the SQL statement generated.

The conversion pattern shown in FIG. 2 is generated so that higher performance and higher operativity can be acquired, based on the constraints shown in Table 1 of a SQL Server query mentioned above, and the characteristic mentioned above.

That is, although many conversion patterns can be considered, the conversion pattern shown in FIG. 2 is very excellent from the field of performance and operativity.

In the present embodiment, the query of which the type in the database after conversion can be determined based on the contents of the query in the database to be converted uses the type.

Further the query of which type cannot be judged among the queries in the database to be converted is judged as the dummy type (the other type), and even if it is any type, a query is generated so that the function thereof may become the same.

In the data conversion apparatus of the present embodiment, in a type determination step, when the child query of the query in a database system to be converted is the function type, the stored-procedure type, or the dummy type, the query is judged as the dummy type. This is because one query after the conversion which certainly fills the required function of the query to be converted cannot be specified.

And about the query to be converted judged as the dummy type or the stored-procedure type, the data conversion apparatus generates the query of stored-procedure type and the query of function type as the query after conversion. Both of the query after conversion includes a function description equivalent to the functional description of the query to be converted.

Because the operativity of the query to be converted over the child query thereof will be high, the query after conversion of the stored-type which includes functional description equivalent to the functional description of the query to be converted is generated.

Further because there is possibility that a parent query of the query to be converted exists, the query after conversion of the function type which includes functional description equivalent to the functional description of the query to be converted is generated.

The dummy type is a type virtually specified in a processing process, and it is not defined by the database system to be converted and after conversion. The type is used for the condition judgment which selects the generation method which generates the query after conversion.

That is, about the target query to be converted which is judged as the dummy type (In case that the child query is a table function type, a stored-procedure type, or the dummy type), since it may be data manipulation (addition, deletion, and update process), the query after conversion of the stored-procedure type which permits these is generated.

In addition, the function may make a query and the query may be referred to in form. Therefore, when it has the child query of the function, it is judged that there is possibility of data manipulation.

Further, about the query to be converted which is judged as the stored-procedure, the query after conversion of the stored-procedure is generated.

Here, the query after conversion of the stored-procedure type is prohibited the nest from other queries (FIG. 2). On the other hand, the query after conversion has a possibility of becoming a child of other queries.

Therefore, the query after conversion of the function type including functional description equivalent to the functional description of the target query is generated.

At this time, name different from the name of the stored-procedure type of the query after conversion are used for the name of the function type of the query after conversion, for example.

Although two queries after conversion of the stored-procedure type and the function type are generated about the target query which is judged as the dummy type. The both sides of the data manipulation function to a lower layer query and the functional exertion as a function type in the case of having a parent query can be achieved.

Thus, in all the cases, about the query judged as the stored-procedure or the dummy type, the query after conversion of the function type is generated with the query of the stored-procedure type of the same function. Consequently even when there is a parent query, problem is not occurred. Though the number of useless queries increases by this, when extension of the application after conversion is assumed, the heavy work which generates the functions manually can be reduced sharply.

Large work mitigation can actually be achieved, at the spot of tool development by the system which uses the data conversion apparatus of the present invention. When performing synthetic application conversion called upsizing, there may be functions never unrealizable only by conversion of a query. Although new queries are generated using the existing query, the work cost changes a lot whether the function capable of being nested is already generated or not. It is the technology which noted that making is serious, but erasing is easy.

Hereafter, the example of the data conversion apparatus relating to the embodiment of the present invention will be explained.

Figure 8:
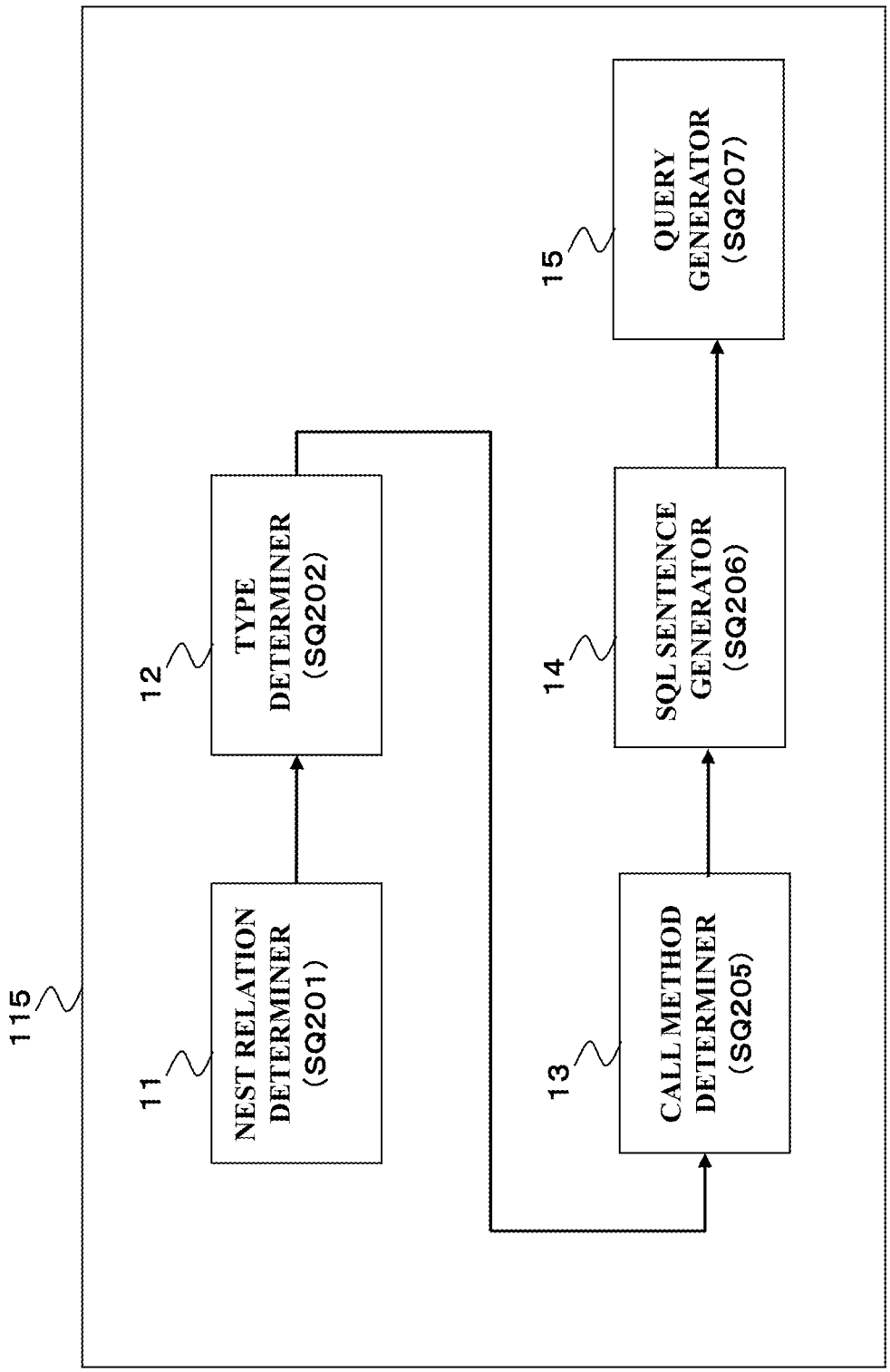
FIG. 8 is a functional block diagram of a conversion apparatus relating to the embodiment of the present invention shown in FIG. 1 and FIG. 2.

FIG. 8 is a functional block diagram of the data conversion apparatus 115 relating to the embodiment of the present invention.

Figure 9:
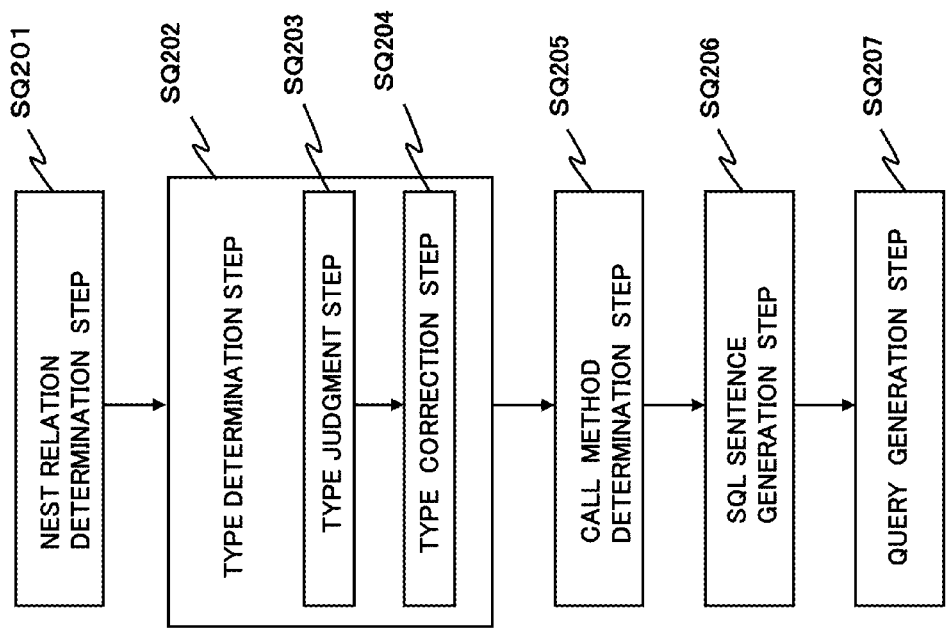
FIG. 9 is a processing flow diagram of the data conversion apparatus relating to the embodiment of the present invention.

The nest relation determiner 11 shown in FIG. 8 performs the nest relation determination step SQ201 shown in FIG. 9. The type determiner 12 performs the type determination step SQ202. The call method determiner 13 performs the call method determination step SQ205. The SQL sentence generator 14 performs the SQL generation step SQ206. The query generator 15 performs the query generation step SQ207.

[Nest Relation Determination Step SQ201]

The nest relation determination step SQ201 determines whether or not it has a nest relation of the query of "Access".

That is, the step determines the relation referred to from other queries.

Figure 10:
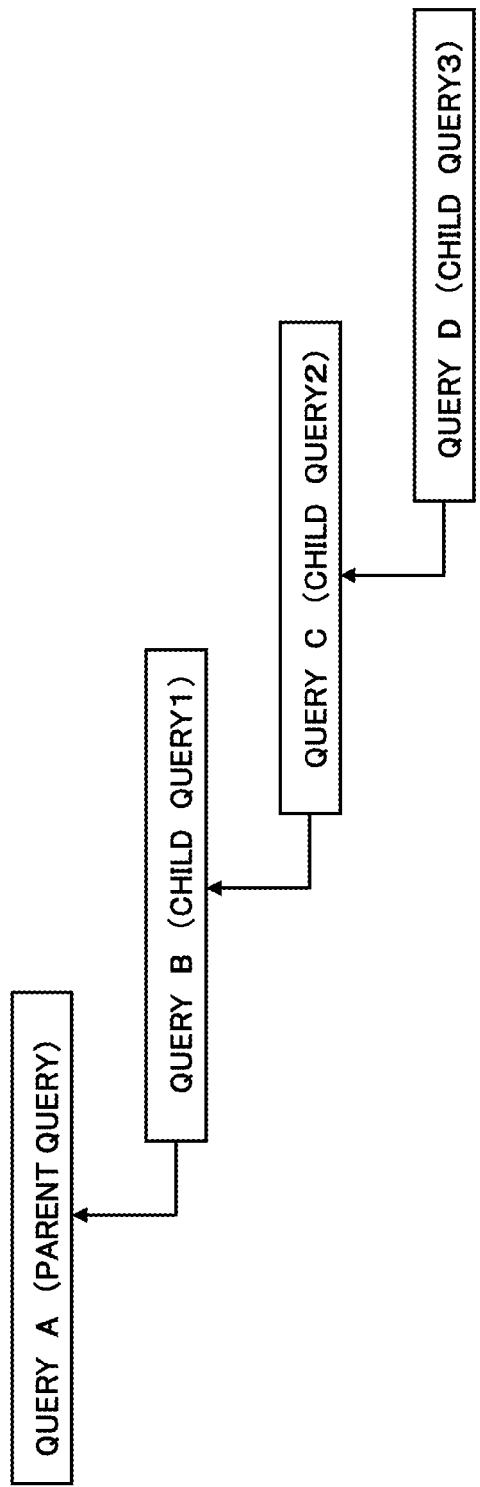
FIG. 10 is an example of processing result of the data conversion apparatus shown in FIG. 8.

When the nest relation of four queries illustrated in FIG. 10 is explained, Query C will be generated with reference to Query D, Query B will be generated with reference to the generated query C concerned, and Query A will be generated with reference to Query B.

Here, in the following explanation, when two adjoining queries are made into an example, the query which refers to is expressed as a parent query and the query which is referred from is expressed as a child query.

In the example of FIG. 10, the Query C is a parent query of the Query D, the Query D is a child query of the Query C. Further the query which is referred from is located in lower layer with respect to the query which refers to. The query which refers to is located in upper layer with respect to the query which is referred from.

In the example of FIG. 10, Query D is located in lower layer from Query C, and Query C is located in upper layer than Query D. Moreover, among four queries A, B, C, D, the query D is located in bottom layer, and the query A is located in top layer. the nest relation determination step SQ201 of the present invention, determines the position relationship of upper layer and lower layer about the reference relation between queries.

[Type Determination Step SQ202]

Based on the nest relation concerned, the type determination step SQ202 determines the type of the queries of which the nest relation mentioned above has been specified sequentially from the query of a bottom layer to the query of a top layer. It is determined as any of a total of four types including the dummy type, in addition to three types (the view, the function and the stored-procedure) used by SQL Server with respect to each query.

As mentioned above, the type determination step SQ202 includes type judgment step SQ203 and type correction step SQ204.

As an outline of operation of each step, the type judgment step SQ203 judges the type of each query from bottom layer.

After judgment of all the queries, the type correction step SQ204 corrects the type of each query if needed. Thereby, finally the type of all the queries is determined. Hereafter, it will be explained concretely using a flow chart.

[Type Judgment Step SQ203]

Figure 11:
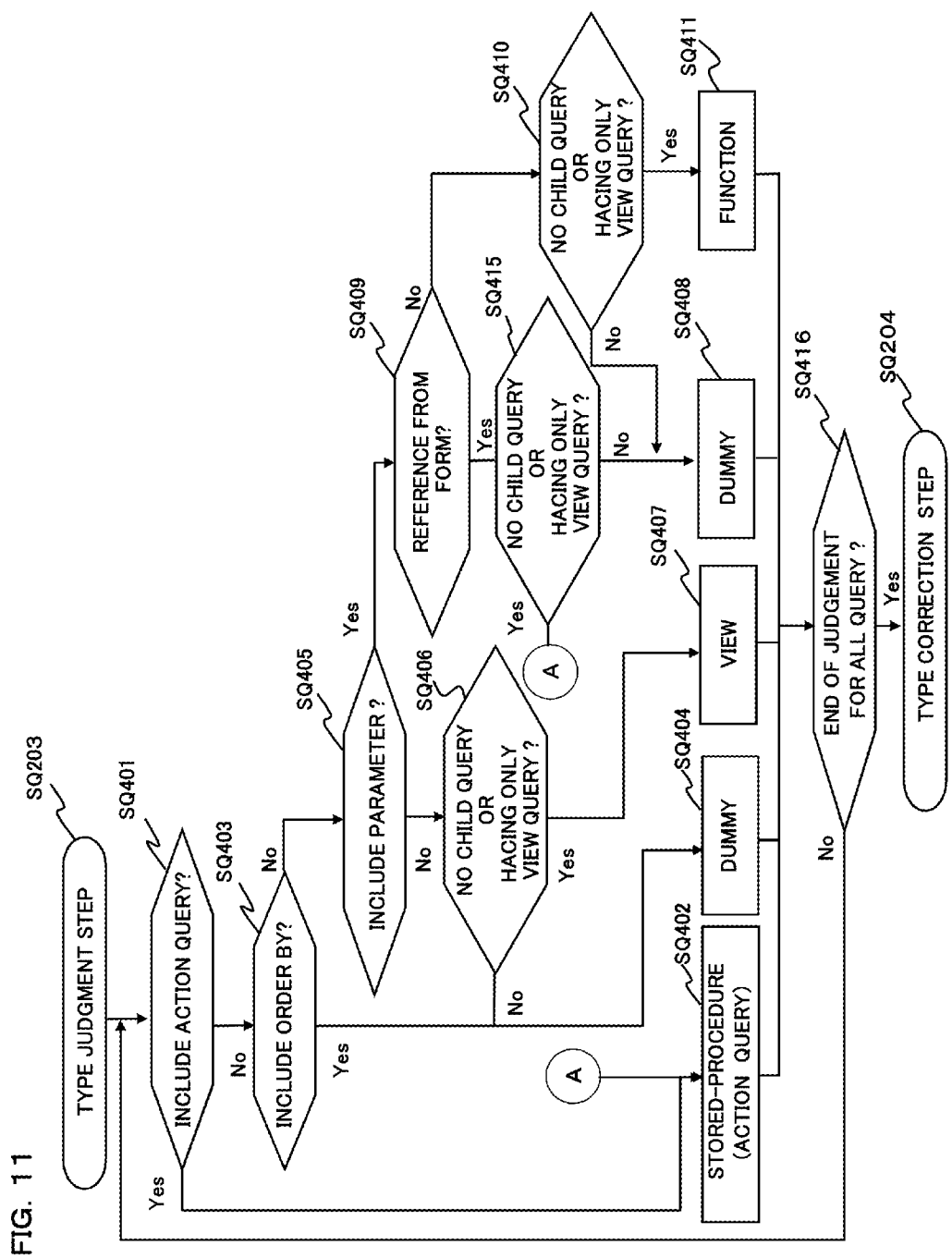
FIG. 11 is a flowchart of type determination step shown FIG. 9.

FIG. 11 is a detailed flow chart of the type judgment step SQ203 shown in FIG. 9.

As shown in FIG. 11, the type judgment step SQ203 judges first whether it is the action query which is the target query mentioned above (SQ401).

When it judges that the target query is an action query, the query concerned is judged as the stored-procedure (SQ402).

When it is not an action query, it is judged whether it is a query including the "ORDER BY" phrase (SQ403).

When the "ORDER BY" phrase is included, the query concerned is judged as the dummy type (SQ404).

When the "ORDER BY" phrase is not included, it is judged whether the parameter is included in the query concerned (SQ405). Here, the query including the parameter is the query including a PARAMETER sentence, the query including "refer to the value to an Access object", and the query including a direct entry parameter.

When the parameter is not included, it is judged whether the query concerned dose not have a child query or have only child of the view type (SQ406). When it is right, the query concerned is judged as the view type (SQ407), and when it is not right, the query concerned is judged as the dummy type (SQ408).

On the other hand, when the parameter is included (it is "Yes" at SQ405), it is judged whether the query concerned is referred to in form (SQ409). When it is referred to, the query concerned is judged as the dummy type (SQ408). When it is not referred to, it is judged whether the query concerned has a child query and whether the child query is the "view" (SQ410). When it is right, the query concerned is judged as the function type (SQ411), and when it is not right, the query concerned is judged as the dummy type (SQ408). Thus, the judgment type of each query is carried out sequentially from the query of a bottom layer (SQ411). And after the judgment about all the queries has completed (SQ416), it progresses to the type correction step SQ204.

[Type Correction Step SQ204]

The type correction step SQ204 corrects the type of the query to be corrected judged in the above-mentioned the type judgment step SQ203 into a suitable type.

In addition, the type correction step SQ204 is carried out sequentially from the query of a bottom layer as well as the type judgment step SQ203.

Figure 12:
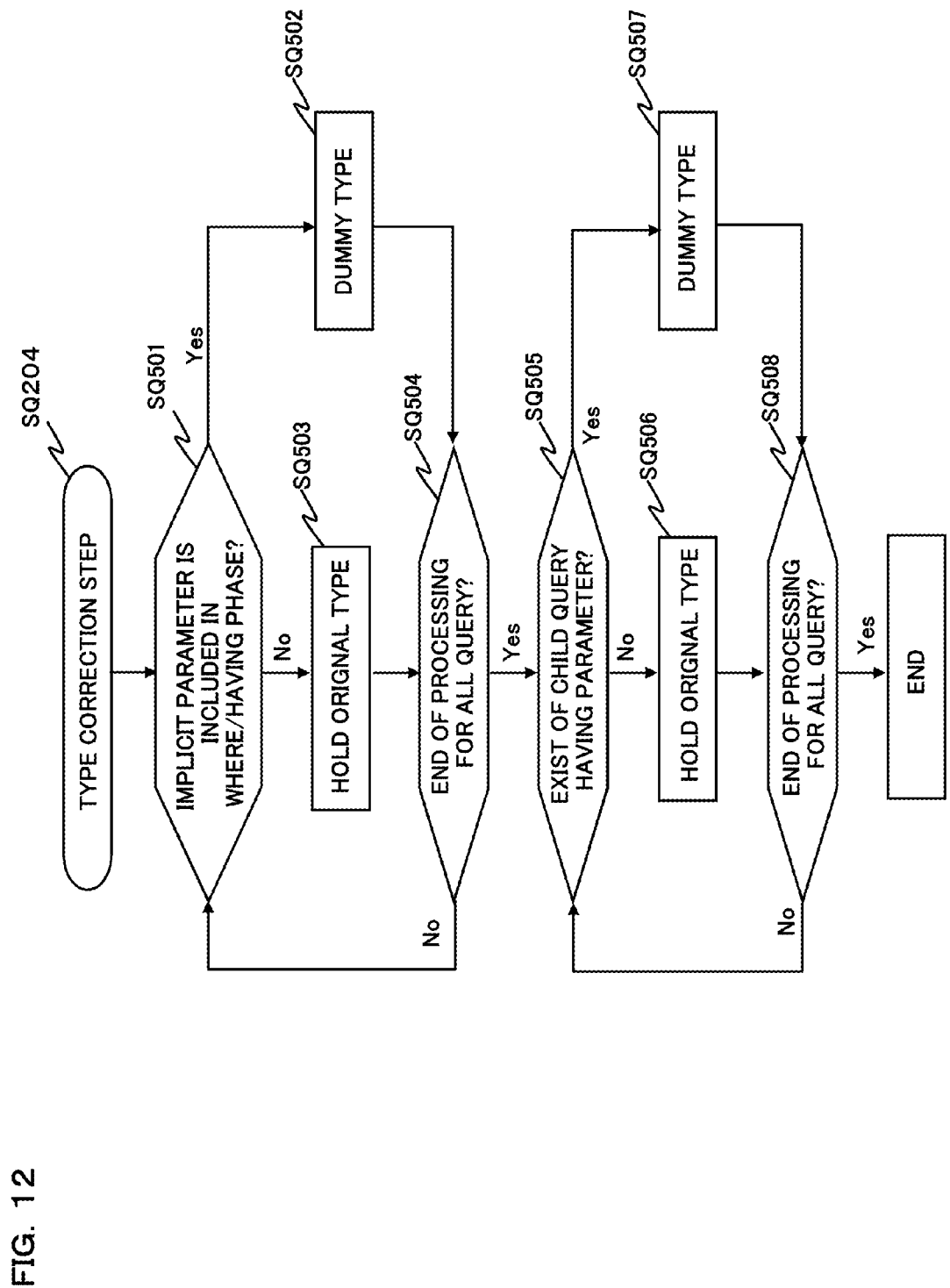
FIG. 12 is a flowchart of type correction step shown FIG. 9.

As shown in FIG. 12, specifically, it is judged whether an implicitness parameter is in the "WHERE" phase or "HAVING" phase of the target query (SQ501). Here, an implicitness parameter is parameter including processing to which the input of a parameter is urged to a user by displaying an input box.

When the implicitness parameter is included in the query concerned, the type of the query concerned is corrected in the dummy type (SQ502). When the implicitness parameter is not included in the query concerned, the type of the query concerned is held (SQ503).

Thus, after having processed to all the queries (SQ504), it is judged whether there is any child query which has a parameter in order from the query of a bottom layer again (SQ505).

When there is no child query with a parameter, the type of the query concerned is held as it is (SQ506). When there is a query corrected into the dummy type by discovering the implicitness parameter, all the queries of the upper layer from the query will have a child query with a parameter, and these are corrected into the dummy type (SQ507).

Thus, if the correction of all the queries is completed (SQ508), the type correction step SQ204 will be ended.

The processing of the type determination step SQ202 will be explained with reference to the example of the query of "Access" comprising four query shown in FIG. 13, FIG. 14, and FIG. 15.

Note that, in the figures, although the type of the query is already indicated, the type is determined by the type determination step from the query (query D) of bottom layer.

Figure 13:
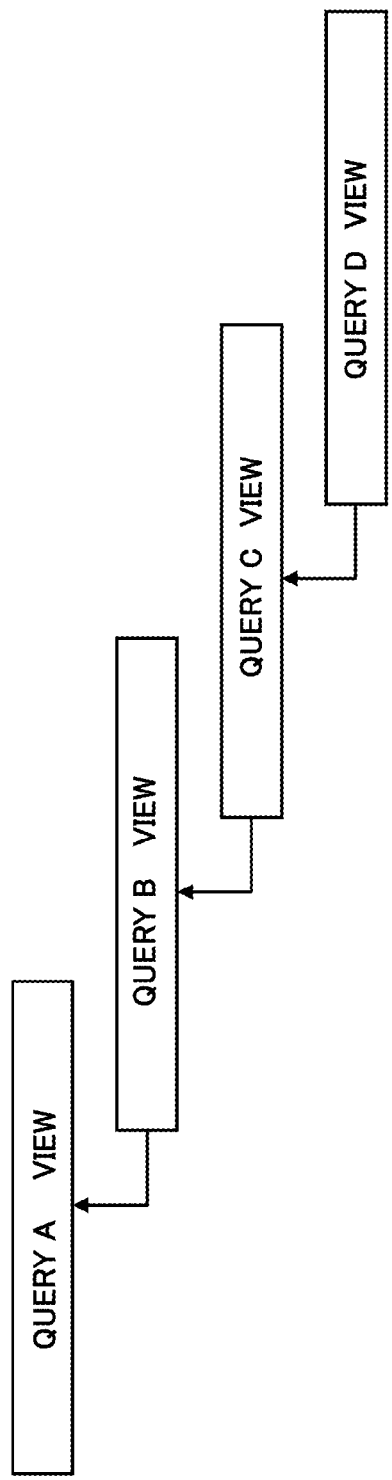
FIG. 13, FIG. 14 and FIG. 15 are examples of processing result of the data conversion apparatus shown in FIG. 8.

Explanation of the example of FIG. 13 will made. The type of the query D of bottom layer is judged according to the procedure shown in FIG. 11.

Here, it is assumed that Query D does not include the action query (SQ401), does not include the "ORDER BY" phrase (SQ403), and does not include the parameter (SQ405). Furthermore, since Query D is located bottom layer (SQ406), the query does not have a child query. Therefore, Query D is judged as the "view" (SQ407).

Next, the type judgment step SQ203 judges a type of Query C. It is assumed that Query C does not include the action query (SQ401), does not include the "ORDER BY" phrase (SQ403), does not include the parameter (SQ405). Moreover, the query D which is a child query of Query C is the "view" (SQ406). Therefore, Query C is judged as the "view" (SQ407).

It is assumed that Query B and Query A do not include the action query (SQ401), do not include the "ORDER BY" phrase (SQ403), do not include the parameter (SQ405) like Query C. Moreover, since the child query of each query is judged as the "view" (SQ406), type of each query is judged as the "view." Thus, the type is judged in order from Query A to Query D.

Next, it progresses to the type correction step SQ204, and processing is performed according to the procedure shown in FIG. 12 in order from Query D to Query A.

Supposing there is no implicitness parameter in all the queries in this case (SQ501), the type of all the queries will be held with the "view" (SQ503, SQ504, SQ505, SQ507, SQ508).

Figure 14:
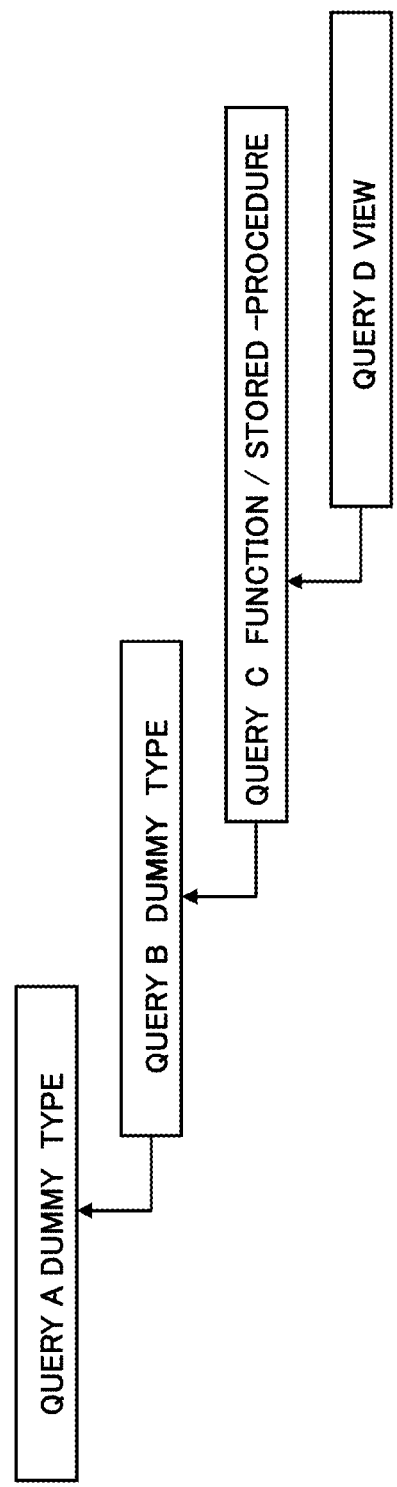

Next, for example, as shown in FIG. 14, Query D is judged as the "view." In the judgment stage of Query C, Query C is judged that it does not include the action query (SQ401), does not include the "ORDER BY" phrase (SQ403), and does not include the parameter (SQ405).

Further, since the type of Query D which is a child query of Query C is the "view" (SQ410), Query C will be judged as the "function" (SQ411).

Then, although Query B does not include the action query (SQ401), does not include the "ORDER BY" phrase (SQ403), does not include the parameter (SQ405), since Query C which is a child query does not include the parameter (SQ406), it is judged as the dummy type (SQ408).

Similarly, although the Query A, does not include the action query (SQ401), does not include the "ORDER BY" phrase (SQ403), does not include the parameter (SQ405), since the Query C which is a child query includes the parameter (SQ406), it is judged as the dummy type (SQ408).

Next, it progresses to the type correction step SQ204, and processing is performed according to the procedure shown in FIG. 12 in order to Query A from Query D.

Supposing there is no implicitness parameter in all the queries in this case (SQ501), about Query C and Query D, the type of the queries will be held as it is (SQ503, SQ504, SQ505, SQ507, SQ508). Since about Query A and Query B, the query C which is a child query has a parameter, it is corrected into the dummy type on the processing (SQ506).

Note that, since Query A and Query B are judged as the dummy type, there the type is not changed.

Next, the type determination of a series of queries in which an implicitness parameter is included and which have other queries will be explained.

Figure 15:
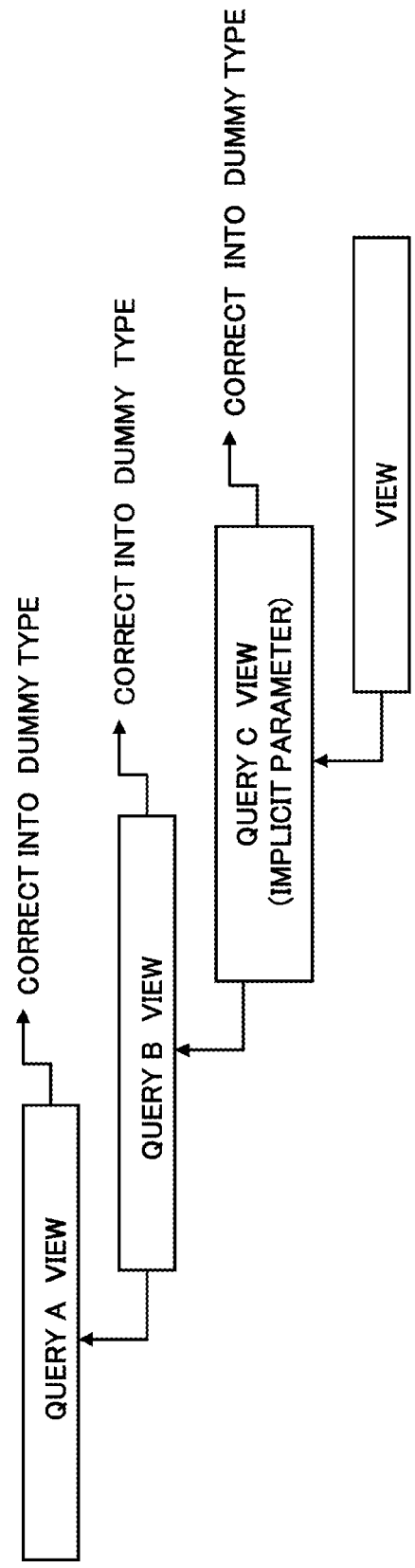

As shown in FIG. 15, the example will be explained that after all the queries are judged as the "view" in the type judgment step SQ203, Query C is a target of processing in the type correction step SQ204. In this example, as shown in FIG. 12, since Query C has an implicitness parameter (SQ501), the type is corrected from the "view" into the dummy type (SQ502).

Supposing there is no implicitness parameter in Query A and Query B, these types will be held with the view type (SQ503).

However, since the parameter was included in Query C, Query A and Query B have a child query with a parameter (SQ505), it is corrected into the dummy type (SQ507).

In addition, except the query including an action query, about the query of upper layer rather than the query judged as the function or the stored-procedure type, it is judged as "Yes" in the SQ403, as "No" in the SQ406, as "Yes" in the SQ409 or as "No" in the SQ410. Therefore, it is judged as the dummy type in all the cases.

Therefore, it is possible that it is judged as the dummy type at the time when the query is located at upper layer than the query which is judged as the function or the stored-procedure type, and the query is not action query in the type judgment step SQ203.

[Call Method Determination Step SQ205]

The call method determination step SQ205 determines call method of the case the query is called as a child query with respect to all the queries of "Access" converted into the four types.

Figure 16:
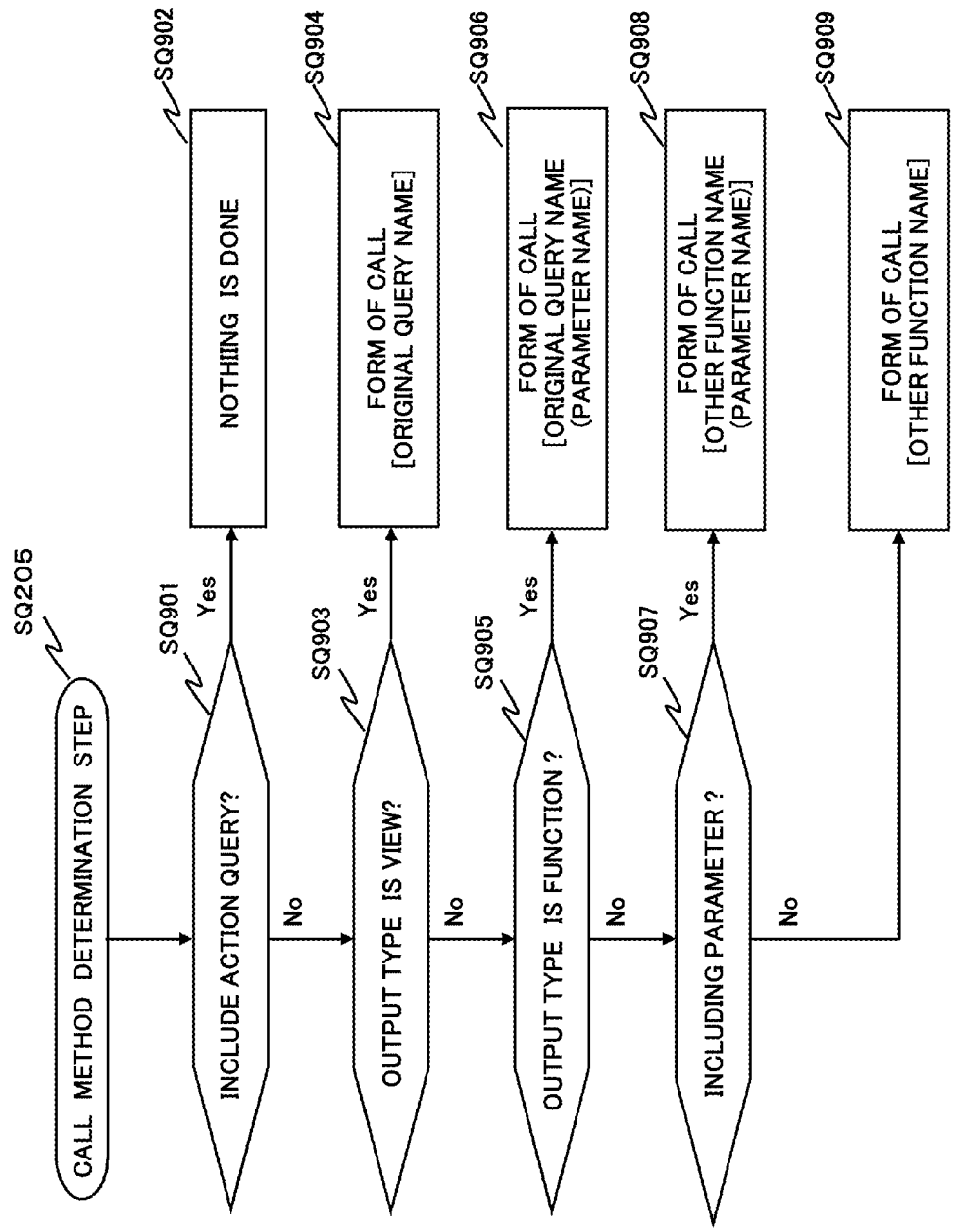
FIG. 16 is a flowchart of call method determination step shown FIG. 9.

As shown in FIG. 16, the call method determination step SQ205 judged whether an action query is included in each query (SQ901). Nothing is done when the action query is included (SQ902). When the action query is not included, it is judged whether the type is the view (SQ903).

When the type is the view, the query concerned is called by the original query name, i.e., the name used by "Access" (SQ904).

When the type is not the view and the type is the function (SQ905), it is called by using the original query name and in the form of parameter (SQ906).

Furthermore, when the type is not the function, and there is a parameter (SQ907), it is called by using a query name other than the original query name and in the form of parameter (SQ908).

Moreover, when there is no parameter, it calls only by a query name other than the original query name (SQ909). Thus, the method of calling when each query is called as a child query is determined.

[SQL Generation Step SQ206]

Based on the SQL sentence used by "Access", the SQL generation step SQ206 which generates suitable SQL for SQL Server will be explained.

When the SQL generation step SQ206 generates suitable SQL for SQL Server, in the case that the description (how to call) for calling a child query is included in the target query, the description concerned is replaced with the method of calling determined by the call method determination step SQ205 which was mentioned above if needed.

Figure 17:
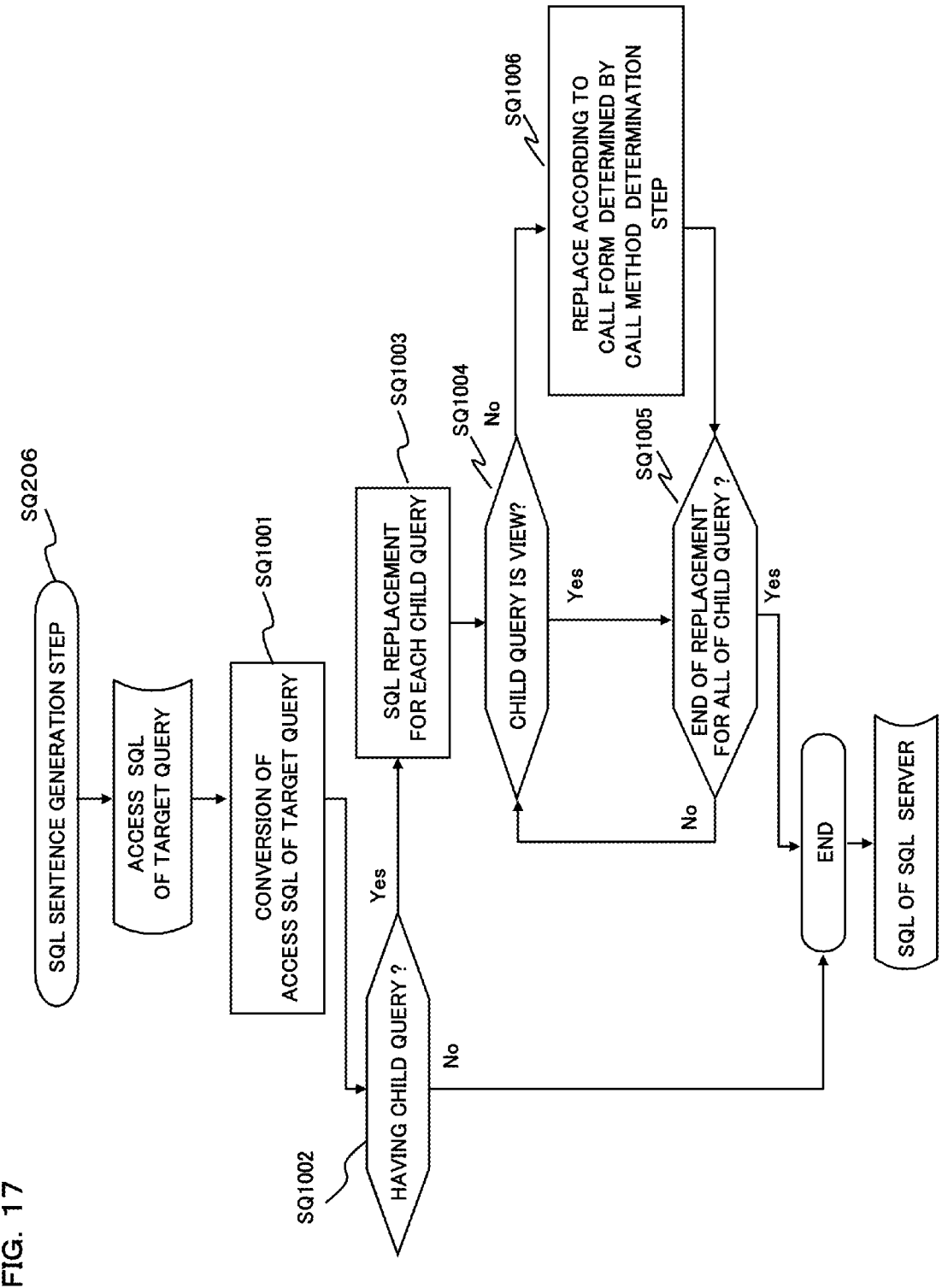
FIG. 17 is a flowchart of SQL sentence generation step shown FIG. 9.
Figure 18:
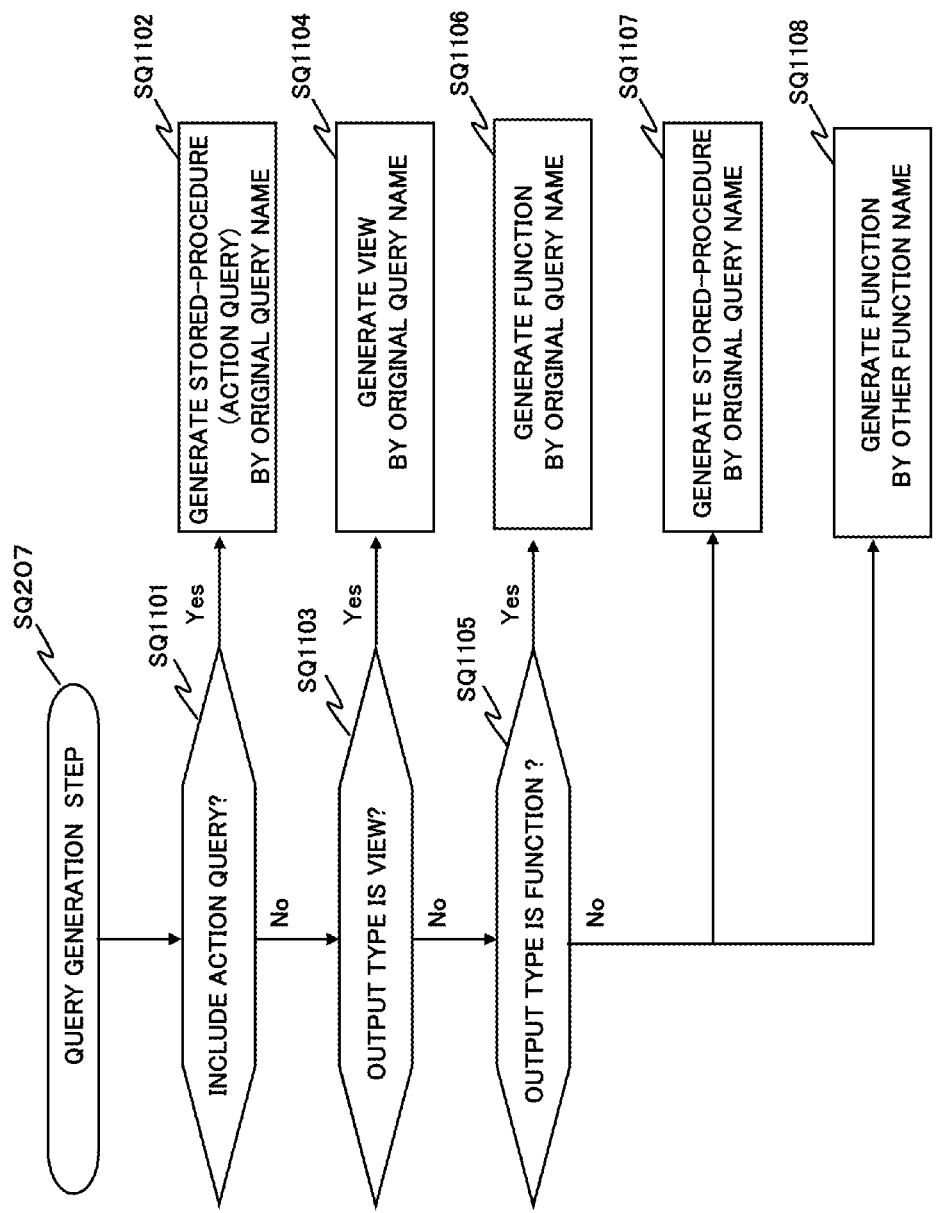
FIG. 18 is a flowchart of query generation step shown FIG. 9.

As shown in FIG. 17, the SQL generation step SQ206 converts the Access SQL of the target query into SQL for SQL Server (SQ1001).

Here, it judges whether the target query has a child query (SQ1002). When it judges it has a child query, it starts replacing processing of the converted SQL sentence with respect to each child query (SQ1003).

Here, it is judged whether the child query is the view (SQ1004). And when it is the view, no replace processing are performed but it progresses to the judgment of the following query (SQ1005).

On the other hand, when the child query of the target query is except the view, it replaces the description of the child query name concerned in the generated SQL sentence, according to the method of calling determined by the call method determination step SQ205 which mentioned above and the type of the child query concerned (SQ1006).

Thus when suitable replacement of all of the child queries is completed, the SQL generation step SQ206 will be ended.

[Query Generation Step SQ207]

The query generation step SQ207 generates the query which can be used by SQL Sever using the SQL sentence generated in the SQL generation step SQ206 which was mentioned above. As shown in FIG. 17, the query generation step SQ207 judges whether the target query includes an action query (SQ1101).

When the action query is included, the stored-procedure (action query) of the original name is generated (SQ1102).

It judges whether the type is the view when an action query is not included (SQ1103), and when the type is the view, query of view type including the original query name is generated (SQ1104).

When the type is not the view, it judges whether the type is the function (SQ1105). Then when the type is the function, query of the function type including the original query name is generated.

On the other hand, when the type is not the function, it generates the stored-procedure including the original query name (SQ1107) and generates the in-line table function including the other function name (SQ1108).

As explained above, according to the present embodiment, while keeping the function of the database system after conversion, judgment processing of the query type at the time of conversion can be simplified, and processing cost can be held down as much as possible.

As mentioned above, about the query judged as the stored-procedure or the dummy type, irrespective of the existence of a parent query, the function type query after conversion other than the same stored-procedure type query after conversion of the function are generated in all cases. As a result problem is not occurred even when there is a parent.

Although a useless query increases by this, when extension of the application after conversion is assumed, manual generation of the function which needs big cost can be reduced sharply.

Large work mitigation can actually be achieved, at the spot of tool development by the system which uses the data conversion apparatus of the present embodiment. When performing synthetic application conversion (conversion of not only conversion of data but functionality) called upsizing, there may be a function never unrealizable only by conversion of the queries. Although a new query is generated by using the existing query, work cost can be greatly reduced when the function which can nest is already generated.

Note that, the function of the apparatus for verifying conversion 117 shown in FIG. 8 may be realized by executing a program by a processing circuit. Further a memory temporally stored data used for the processing of the processing circuit. The processing of the apparatus for verifying conversion 117 is described in the program.

This invention is not limited in the embodiment mentioned above. Namely, regarding the component in the embodiment mentioned above, a person skilled in the art can do various changes, combination, sub-combination and substitution in the technical or equivalent scope of this invention.

For example, in the embodiment mentioned above, the example which the related database system to be converted is "Access" of Microsoft Corp., and the database system of after conversion is "SQL Server" of Microsoft Corp. is explained.

It may apply other database system having the function described in claims.

TABLE 1

| | QUERY TYPE (SQL SERVER) | | |
|---|---|---|---|
| | VIEW | FUNC-TION | STORED-PROCEDURE |
| INCLUDING "ORDER BY" PHASE | X | ○ | ○ |
| INCLUDING PARAMETER | X | ○ | ○ |
| ADDETION, DELATION, UPDATE | ○ | X | ○ |
| NEST FROM OTHER QUERY | ○ | ○ | X |

The invention claimed is:

1. A method for verifying conversion when converting management operation data in which a query command for a first database described in a first program processed with the first database into a management operation data which described a query of the same function in a second program processed with a second database, comprising:
- a first step for inserting an acquisition operation code acquiring a first management operation data operating for a table data in the first program into the first program;
- a second step for acquiring a result which is obtained by converting the first management operation data obtained by the acquisition operation code in the process of executing the first program into the second management operation data of the second database;
- a third step for carrying out the first management operation data with the first database system and carrying out the second management operation data with the second database system; and
- a fourth step for comparing the data acquired depending on the processing of the first management operation data in the third step and the data acquired depending on the processing of the second management operation data in the third step,
- the first program comprises a plurality of first queries, and the second program comprises a plurality of second queries,
- the first query permits all of parameter, processing of addition, deletion and updating with respect to a database, and becoming a child query of a other query different from the second query, and
- the second query comprises:
- a view type which prohibits the parameter, permits the processing of addition, deletion and update, and permits becoming a child query of the other query;
- a function type which permits the parameter, prohibits the processing of addition, deletion and update, and permits becoming a child query of the other query; and
- a stored-procedure type which permits the parameter, permits the processing of addition, deletion and update, and prohibits becoming a child query of the other query,
- the second step is performed by a processing circuit of a conversion apparatus and comprises of:
- reading the plurality of the first queries of the first database system from a memory of the conversion apparatus;
- determining a nest relation of a plurality of the first queries;
- determining the type of the second query corresponding to each of the first query by determining in turn from the first query of a bottom layer to the first query of a top layer based on the nest relation; and
- generating the second query corresponding to the first query according to the type determined by the determining type in turn from the first query of the bottom layer to top layer based on the nest relation;
- the determining the type of the second query is performed by the processing circuit and comprises
- determining the second query corresponding to the first query as a dummy type when a child query of the first query is the function type or the stored-procedure type or the dummy type, and
- determining the second query corresponding to the first query as a view type when it is judged that the first query is not an action query and it is jugged that the first query not includes the parameter or the child is the view type,
- the generating the second query is performed by the processing circuit and comprises,
- generating the second query of the stored-procedure type including the function description equivalent to the functional description of a target query and generating the second query of the function type including function description equivalent to the functional description of the target query with respect to the target query which is the second query judged in the determining type as the dummy type or the stored-procedure type.

2. A method for verifying conversion as set forth in claim 1, wherein the management operation data is a SQL sentence data in which a query is described as the query command.

3. A method for verifying conversion as set forth in claim 2, wherein when the first SQL sentence data and the second SQL sentence data are not for acquiring the operation result with respect to the table data, the first SQL sentence data and the second SQL sentence data are converted into SQL sentence data acquiring the data of the operation result or under operation, and the SQL sentence data after conversion is executed in the third step.

4. A method for verifying conversion as set forth in claim 3, wherein:
- first data which is acquired depending on the execution of the first SQL sentence data are stored sequentially in a predetermined point in execution result table data decided beforehand in the third step, and second data which is acquired depending on the execution of the second SQL sentence data are stored sequentially in a predetermined point in the execution result table data in the third step, and
- the second data are compared with the first data in the execution result table data in the fourth step.

5. A method for verifying conversion as set forth in claim 4, wherein when an execution command data of the first SQL sentence data and a top character string of the first SQL sentence data following the execution command data are detected, the acquisition operation code is inserted at one row above the execution command data in the first step.

6. A method for verifying conversion as set forth in claim 5, further comprising, a fifth step for transmitting the first SQL sentence data and the second SQL sentence data which produced a disagreement of data by the comparison of the fourth step to a predetermined data processing apparatus.

7. A method for verifying conversion as set forth in claim 5, further comprising a sixth step for converting a SQL sentence data other than a "SELECT" sentence of the SQL sentence data of the first management operation data prior to the conversion of the second step and the second management operation data after the conversion of the second step into the "SELECT" sentence,
wherein the first management operation data after conversion of the sixth step is carried out with the first database system and the second management operation data after the conversion of the sixth step is carried out with the second database system.

8. An apparatus for verifying conversion when converting management operation data in which a query command for a first database described in a first program processed with the first database into a management operation data which described a query of the same function in a second program processed with a second database, comprising:
- an inserter inserting an acquisition operation code acquiring a first management operation data operating for a table data in the first program into the first program;
- an acquirer acquiring a result which is obtained by converting the first management operation data obtained by the acquisition operation code in the process of executing the first program into the second management operation data of the second database;
- a computer carrying out the first management operation data with the first database system and carrying out the second management operation data with the second database system; and a comparator comparing the data acquired depending on the processing of the first management operation data and the data acquired depending on the processing of the second management operation data, the first program comprises a plurality of first queries, and the second program comprises a plurality of second queries, the first query permits all of parameter, processing of addition, deletion and updating with respect to a database, and becoming a child query of a other query different from the second query, and the second query comprises:

a view type which prohibits the parameter, permits the processing of addition, deletion and update, and permits becoming a child query of the other query;

a function type which permits the parameter, prohibits the processing of addition, deletion and update, and permits becoming a child query of the other query; and a stored-procedure type which permits the parameter, permits the processing of addition, deletion and update, and prohibits becoming a child query of the other query, the acquiring the result is performed by a processing circuit of a conversion apparatus and comprises of:

reading the plurality of the first queries of the first database system from a memory of the conversion apparatus;

determining a nest relation of a plurality of the first queries;

determining the type of the second query corresponding to each of the first query by determining in turn from the first query of a bottom layer to the first query of a top layer based on the nest relation; and generating the second query corresponding to the first query according to the type determined by the determining type in turn from the first query of the bottom layer to top layer based on the nest relation;

the determining the type of the second query is performed by the processing circuit and comprises determining the second query corresponding to the first query as a dummy type when a child query of the first query is the function type or the stored-procedure type or the dummy type, and determining the second query corresponding to the first query as a view type when it is judged that the first query is not an action query and it is jugged that the first query not includes the parameter or the child is the view type, the generating the second query is performed by the processing circuit and comprises, generating the second query of the stored-procedure type including the function description equivalent to the functional description of a target query and generating the second query of the function type including function description equivalent to the functional description of the target query with respect to the target query which is the second query judged in the determining type as the dummy type or the stored-procedure type.

9. A computer program for verifying conversion when converting management operation data in which a query command for a first database described in a first program processed with the first database into a management operation data which described a query of the same function in a second program processed with a second database, the computer program having computer instructions on a non-transitory computer readable medium, the instructions being adapted to enable a computer system to perform operation, comprising:

a first step for inserting an acquisition operation code acquiring a first management operation data operating for a table data in the first program into the first program;

a second step for acquiring a result which is obtained by converting the first management operation data obtained by the acquisition operation code in the process of executing the first program into the second management operation data of the second database;

a third step for carrying out the first management operation data with the first database system and carrying out the second management operation data with the second database system; and a fourth step for comparing the data acquired depending on the processing of the first management operation data in the third step and the data acquired depending on the processing of the second management operation data in the third step, the first program comprises a plurality of first queries, and the second program comprises a plurality of second queries, the first query permits all of parameter, processing of addition, deletion and updating with respect to a database, and becoming a child query of a other query different from the second query, and the second query comprises:

a view type which prohibits the parameter, permits the processing of addition, deletion and update, and permits becoming a child query of the other query;

a function type which permits the parameter, prohibits the processing of addition, deletion and update, and permits becoming a child query of the other query; and a stored-procedure type which permits the parameter, permits the processing of addition, deletion and update, and prohibits becoming a child query of the other query, the second step is performed by a processing circuit of a conversion apparatus and comprises of:

reading the plurality of the first queries of the first database system from a memory of the conversion apparatus;

determining a nest relation of a plurality of the first queries;

determining the type of the second query corresponding to each of the first query by determining in turn from the first query of a bottom layer to the first query of a top layer based on the nest relation; and generating the second query corresponding to the first query according to the type determined by the determining type in turn from the first query of the bottom layer to top layer based on the nest relation;

the determining the type of the second query is performed by the processing circuit and comprises determining the second query corresponding to the first query as a dummy type when a child query of the first query is the function type or the stored-procedure type or the dummy type, and determining the second query corresponding to the first query as a view type when it is judged that the first query is not an action query and it is jugged that the first query not includes the parameter or the child is the view type, the generating the second query is performed by the processing circuit and comprises, generating the second query of the stored-procedure type including the function description equivalent to the functional description of a target query and generating the second query of the function type including function description equivalent to the functional description of the target query with respect to the target query which is the second query judged in the determining type as the dummy type or the stored-procedure type.

* * * * *